W. Westlake,

Wire-Working Tool.

No. 2,232. Reissued Apr. 17, 1866.

Witnesses.

Jas. A. Cowles

A. Chapel.

Inventor.

William Westlake.

N. PETERS, PHOTO-LITHOGRAPHER, WASHINGTON, D. C.

UNITED STATES PATENT OFFICE.

WILLIAM WESTLAKE, OF CHICAGO, ILLINOIS.

IMPROVED MACHINE FOR MAKING LANTERNS.

Specification forming part of Letters Patent No. 47,478, dated April 25, 1865; Reissue No. 2,232, dated April 17, 1866.

*To all whom it may concern:*

Be it known that I, WILLIAM WESTLAKE, of the city of Chicago, in the county of Cook and State of Illinois, have invented a certain new and useful Improvement on Machines for Making Lanterns or Parts thereof; and I do hereby declare that the following is a full, clear, and exact description of the same, reference being had to the accompanying drawings, and to the letters and marks thereon.

The improvement of this application is more particularly intended to be used in the construction of lantern-guards which have heretofore been made by hand, and in making of which by machines the making of lanterns is greatly expedited and the guards more perfectly constructed than when made by hand only.

Figure 1:
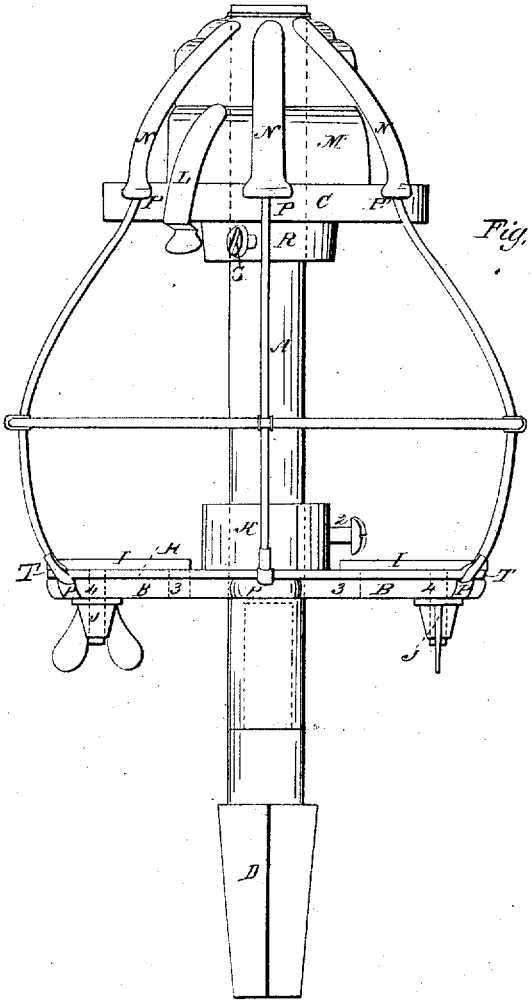
Figure 2:
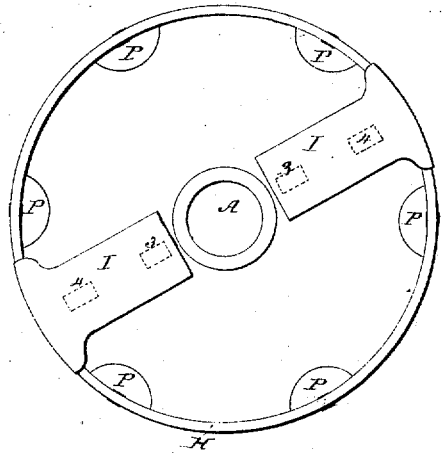

The drawings forming part of this specification represent this machine, Figure 1 being a view in elevation, and Fig. 2 being a view of the bottom of the machine.

In each of these figures similar letters refer to similar parts.

*a* is a vertical shaft, which may be made either solid or hollow.

*b* is a plate located at one end of the shaft *a*.

*c* is a similar plate located at or near the other end of the shaft *a*, as shown in the drawings. The lower end of the shaft *a* is fitted to a socket, *d*, in such a way as that it can be removed at pleasure, and also so that it can be revolved at pleasure, which enables the workman to change its position and bring any part of the machine to any point he desires. The shaft *a* can be inverted and the upper end rest on the socket *d*, the same as the lower end, it being provided with the same facilities. The socket *d* may be attached to a general machine, of which this machine will form a part, or it may be fitted with a pedestal or base-block, as usual with machines for making sheet and other metal into form.

*e e* are recesses in the plates *b* and *c*. These recesses in the plate *b* vary in size, according to circumstances, being made larger than those in the plate *c*, to enable the operator to work at the end of the vertical bars with facility.

*g g* is a circular recess on the upper side of the plate *b*, and located at or near its edge, so the lower circular bar, *h*, of the guard will rest in it.

*i i* are slides located on the plate *b*. Screws from the slides pass down through the plate, on the ends of which are placed the clamping-nuts *j j*. At the inner end of the slides are guide-studs which pass through the plate *b*. The screws *j j* and guide-studs enable the slides *i i* to be adjusted at pleasure. They are plainer shown at Fig. 2.

*k k* are hubs located on the shaft *a* at convenient distances apart, and can be adjusted by means of the thumb-screws *l l*. The plates *b* and *c* rest upon or adjacent to these hubs, and the plates *b* and *c* can be moved nearer to or more distant apart by a corresponding movement of the hubs *k k* to correspond to different lengths of guards. The plates *b* and *c* could also be made to conform to guards of different diameter, the plates being made in sections with means of extending and drawing in such sections.

To the upper end of the shaft *a* is connected a dome, *m*, that may easily be attached or detached, having spring-fingers or spring-bars *n*, the lower ends of which will cover the ends of the upright bars or rods of the guards, and hold them in place while the guard is being constructed. When the guard is constructed to a certain extent, the springs *n n* are removed from the ends of the guards by lifting the dome from the end of the shaft, and the ends of the vertical bars or guides are clipped, and thus all are made exactly of the same length.

From this description of the construction of machine it will readily be seen that very great facilities exist for rapidly and perfectly making lantern-guards of any size or dimensions that may be required, and that the connecting or uniting of the different rods or bars of the guard by tying or soldering will be rendered easy and the work more perfectly accomplished.

What I claim as my invention, and desire to secure by Letters Patent, is—

1. The plate B, with groove T, and notches P P P or its equivalent, constructed substantially as described.

2. The grooved and notched plate B, in combination with a clamping device, substantially as described.

3. The combination of the grooved and notched plate B with the shaft A, in the manner described.

4. The combination of the shaft A, grooved and notched plate B, with the slides I I or their equivalent, in the manner described.

5. The combination of the shaft A with the plates B and C, in the manner and substantially as described.

6. The combination of the shaft A, plates B and C, with the springs N N, substantially as described.

7. A former or device, constructed substantially as described, upon which to make lantern-guards.

WILLIAM WESTLAKE.

Witnesses:
JAS. A. COWLES,
SETH M. DUNNING.